(12) United States Patent
Blanc

(10) Patent No.: US 7,353,752 B2
(45) Date of Patent: Apr. 8, 2008

(54) DEVICE FOR PRODUCING A DRINK BY INFUSION

(75) Inventor: Jean-Pierre Blanc, Nice (FR)

(73) Assignee: Compagnie Mediterraneenne des Cafes S.A., Carros (FR)

(*) Notice: Subject to any disclaimer, the term of this patent is extended or adjusted under 35 U.S.C. 154(b) by 0 days.

(21) Appl. No.: 11/315,326

(22) Filed: Dec. 23, 2005

(65) Prior Publication Data
US 2006/0096464 A1  May 11, 2006

Related U.S. Application Data

(63) Continuation of application No. PCT/EP2004/051134, filed on Jun. 16, 2004.

(30) Foreign Application Priority Data
Jun. 25, 2003  (FR) ................... 03 50253

(51) Int. Cl.
A47J 31/00  (2006.01)
(52) U.S. Cl. ............... 99/298; 99/295; 99/302 P
(58) Field of Classification Search ............... 99/295, 99/302 P, 308, 309, 300, 291, 290, 298, 302 R; 426/433, 432, 435
See application file for complete search history.

(56) References Cited

U.S. PATENT DOCUMENTS

| | | | | |
|---|---|---|---|---|
| 1,418,436 A * | 6/1922 | Gardiner | ...................... | 99/298 |
| 1,471,933 A * | 10/1923 | Wertheimer | ................. | 99/309 |
| 5,230,277 A * | 7/1993 | Bianco | ....................... | 99/287 |
| 5,755,149 A * | 5/1998 | Blanc et al. | ............... | 99/289 T |
| 6,101,923 A * | 8/2000 | Karg et al. | ................ | 99/289 D |
| 6,520,070 B1 | 2/2003 | Heczko | | |
| 6,526,872 B2 * | 3/2003 | Wong | .......................... | 99/282 |
| 2002/0088348 A1 * | 7/2002 | Cortese | ....................... | 99/295 |

FOREIGN PATENT DOCUMENTS

| | | |
|---|---|---|
| WO | WO 95/07041 | 3/1995 |
| WO | WO 95/17121 | 6/1995 |

* cited by examiner

Primary Examiner—Reginald L. Alexander
(74) Attorney, Agent, or Firm—Young & Thompson

(57) ABSTRACT

A device for producing beverages by infusion of a ground product, includes an infusion chamber capable of receiving the ground product and a hot water circuit passing through the infusion chamber. Characteristically, the device includes at least one additional infusion chamber placed in series with the first infusion chamber in the hot water circuit.

6 Claims, 1 Drawing Sheet

DEVICE FOR PRODUCING A DRINK BY INFUSION

FIELD OF THE INVENTION

The invention relates to a device for production of a beverage by infusion and a coffee machine equipped with such a device.

The invention will apply to the manufacture of coffee machines of the type used to produce individual beverages, or beverages in larger quantities for hotel or professional use. In particular, the invention applies to coffee machines using packages of ground coffee in the form of prepackaged doses also called "pods" or capsules, such as specified in document WO-A-95/07041.

BACKGROUND OF THE INVENTION

The coffee machines currently on the market comprise an infusion chamber receiving a determined amount dose of ground product either prepackaged or in bulk. Therefore only one dose can be used at a time, which limits the flexibility of the coffee machines, particularly when wishing to make a larger quantity of coffee or when wishing to vary the intensity of the flavor.

The invention remedies this drawback and, to do this, describes a device for producing beverages as well as an improved coffee machine.

The invention has the advantage of presenting multiple infusion chambers placed in series in the production circuit in such a way as to be able to use one or multiple doses of ground coffee. It is therefore perfectly possible to adapt the operation of the device to needs.

Other aims and advantages will appear during the following description of a preferred embodiment of the invention, which is however not restrictive.

SUMMARY OF THE INVENTION

The invention relates to a device for producing beverages by infusion of a ground product, comprising an infusion chamber capable of receiving the ground product and a hot water circuit passing through the said infusion chamber. According to the invention, this device comprises at least one additional infusion chamber placed in series with the first infusion chamber in the hot water circuit.

According to preferred but not restrictive possibilities, the device is such that:

it includes an additional chamber, it includes a fixed central part acting with a first mobile lateral part to form the first infusion chamber and with a second mobile part to form the additional infusion chamber, the hot water circuit includes an extraction circuit passing through the infusion chamber(s) and a peripheral circuit parallel to the extraction circuit between an inlet valve upstream of the infusion chambers, and an outlet valve downstream of the infusion chambers, the said valves being configured to allow closed loop circulation in the extraction circuit and the peripheral circuit, the inlet valve has a line connected to the hot water supply, the outlet valve has a line connected to the beverage outlet, means for reversing hot water circulation through the infusion chambers, it includes a pump for circulating the hot water, the said pump having a controlled operating direction forming the means for reversing the hot water circulation through the infusion chambers, the extraction circuit and the peripheral circuit have a total volume corresponding to that of the beverage to be produced.

The invention also concerns a coffee machine that can be used with prepackaged ground coffee doses characterized in that it includes a device according to the invention.

Figure 1:
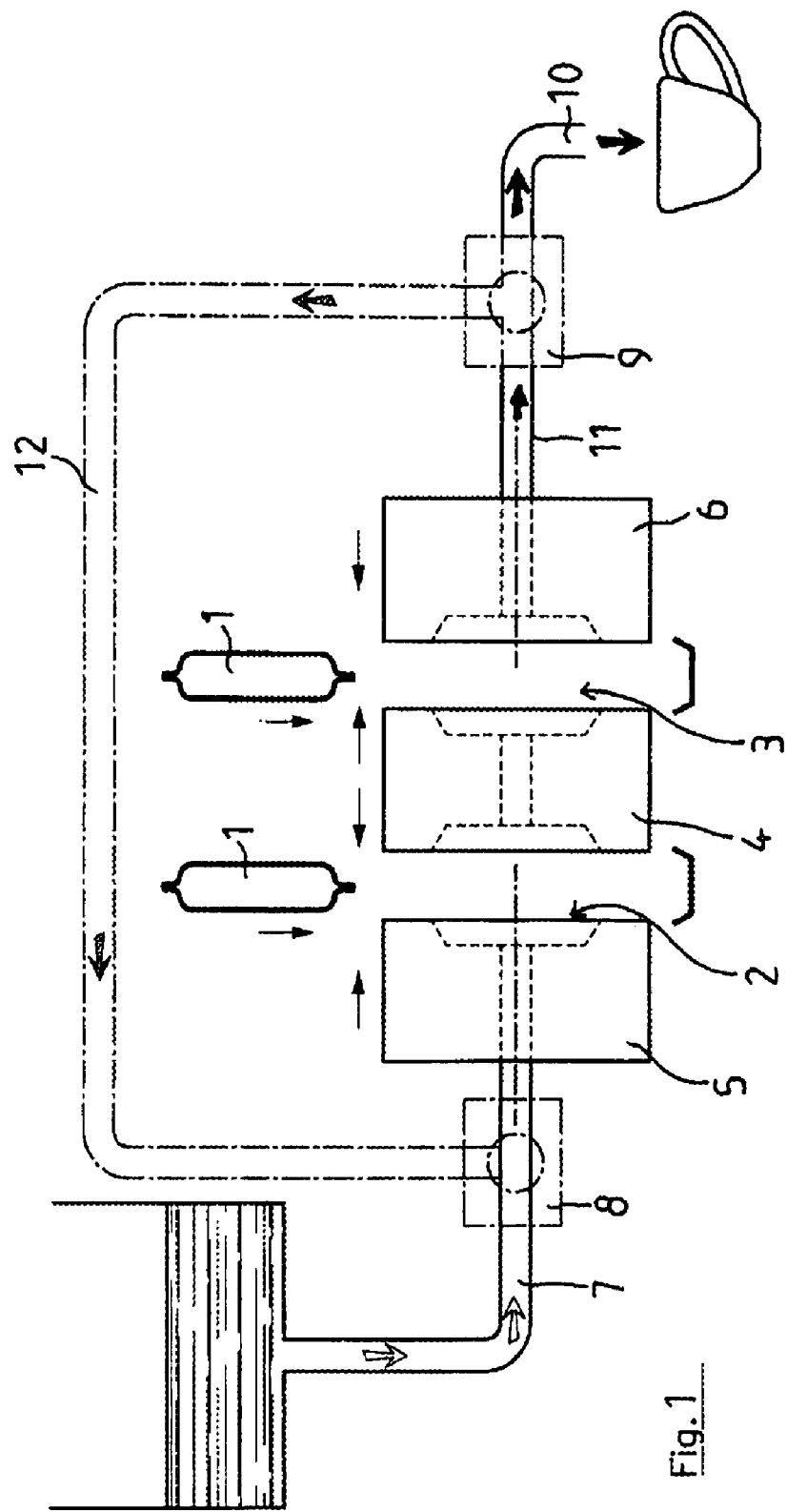
FIG. 1 represents a device with plural infusion chambers.

In the remainder of the description, an embodiment of the invention using the prepackaged doses 1, presented in the form of capsules or "pods" containing the ground coffee, is described. In particular, it is possible to use capsules or "pods" of the type presented in publication WO-A-95/07041. It is also possible to use prepackaged doses without peripheral reinforcing, less rigid. Of course, the invention also applies to unpackaged ground coffee.

Here we describe the case of a device presenting two infusion chambers although this situation is not restrictive of the invention.

DETAILED DESCRIPTION OF THE INVENTION

In a preferred manner, infusion chambers comprise three mobile parts 4, 5 and 6 separated by intervals 3 approaching and moving apart and/or rotating in such a way as to open and close infusion chambers depending on the operating phase. Concerning this mobility, reference is explicitly made here to the mobility described in the documents WO-A-95/07041, WO-A 95/17121 or to publications WO-A 00/38558 and WO-A 00/44268. The phases of introduction and ejection as well as the phases of opening or closing of chambers may comply with those presented in this prior art.

A hot water circuit is shown, part of which, here referred to as extraction circuit 11, passes through infusion chambers. Upstream of extraction circuit 11, the hot water circuit is connected to a hot water supply 7 which is here shown schematically for the purpose of explanation. A conventional hot water supply system may be used including a cold water tank, a boiler and an outlet from the boiler which is capable of supplying the injection circuit with hot water.

Still in a conventional manner, the circuit includes an outlet part 10 capable of delivering the beverage produced.

According to a preferred variant of the invention, the hot water circuit includes, in addition to extraction circuit 11, a peripheral circuit 12 allowing recirculation of the liquid after infusion, either in the same direction as previously or in a reverse direction. In this context, means are present for reversing hot water circulation through the infusion chamber.

In the embodiment described here, these means are a pump placed in the hot water circuit and capable of being controlled in both operating directions to reverse the circulation.

As an indication, the pump is positioned upstream of infusion chamber. It can be controlled manually (the user determines the water circulation direction using a switch), or else be automated.

In the illustrated example, in addition to the extraction circuit 11, the water circuit includes a peripheral circuit marked 12 capable of forming part of the circulation parallel to extraction circuit 11. Parts 11 and 12 of the water circuit meet upstream of infusion chamber and downstream of said chamber. More exactly, inlet valve 8 is provided to link extraction circuit 11 and peripheral circuit 12 as well as to connect hot water supply 7. Downstream of infusion chamber, an outlet valve 9 is shown in order to link extraction circuit 11, peripheral circuit 12 and beverage outlet 10.

Still in a preferred manner, the total volume of extraction circuit 11 and peripheral circuit 12 have approximately the same volume as that of the beverage to be produced.

Below is a possible way for the device subject of the invention to operate.

The circulation of the hot water from supply 7 is produced by the actuating of the pump in such a way as to produce circulation through infusion chambers in the direction of the arrow indicated in extraction circuit 11. Valves 8 and 9 are then configured to direct the beverage thus partially produced into peripheral circuit 12.

Valve 9 is such that outlet 10 is not open. By configuring valves 8 and 9 in such a way as to constitute a closed loop with extraction circuit 11 and peripheral circuit 12, circulation can take place several times through infusion chambers. Moreover, by reversing the pump direction, this circulation can operate in the opposite direction.

When a new recirculation has been operated, valve 9 opens towards the outlet 10 so as to discharge the drink.

By controlling valves 8, 9 and the pump, the number of circulations and their direction can be easily selected. The cycles can also be reversed.

References
  1. Prepackaged dose
  2. Infusion chamber
  7. Hot water supply
  8. Inlet valve
  9. Outlet valve
  10. Drink outlet
  11. Extraction circuit
  12. Peripheral circuit

The invention claimed is:

1. Device for production of beverages by infusion of a ground product, comprising an infusion chamber capable of receiving the ground product and a hot water circuit passing through the said infusion chamber, characterized in that it comprises at least one additional infusion chamber placed in series with the first infusion chamber in the hot water circuit, there being a fixed central part acting with a first mobile lateral part to form said first infusion chamber and with a second mobile part to form said additional infusion chamber.

2. Device according to claim 1 characterized in that the hot water circuit includes an extraction circuit (11) passing through infusion chambers and a peripheral circuit (12) parallel to extraction circuit (11) between an inlet valve (8), upstream of infusion chambers, and an outlet valve (9), downstream of infusion chambers, said valves (8, 9) being configured to allow closed loop circulation in extraction circuit (11) and peripheral circuit (12).

3. Device according to claim 2 characterized in that inlet valve (8) has a line connected to hot water supply (7).

4. Device according to claim 3 characterized in that outlet valve (9) has a line connected to beverage outlet (10).

5. Device according to claim 2 characterized in that extraction circuit (11) and peripheral circuit (12) present a total volume corresponding to that of the drink to be produced.

6. Coffee machine that can be used with prepackaged doses (1) of ground coffee characterized in that it comprises a device according to claim 1.

* * * * *